(12) United States Patent
Raich

(10) Patent No.: US 12,291,262 B2
(45) Date of Patent: May 6, 2025

(54) STEERING COLUMN FOR A MOTOR VEHICLE

(71) Applicants: thyssenkrupp Presta AG, Eschen (LI); thyssenkrupp AG, Essen (DE)

(72) Inventor: Thomas Raich, Vandans (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/029,880

(22) PCT Filed: Sep. 29, 2021

(86) PCT No.: PCT/EP2021/076770
§ 371 (c)(1),
(2) Date: Mar. 31, 2023

(87) PCT Pub. No.: WO2022/069531
PCT Pub. Date: Apr. 7, 2022

(65) Prior Publication Data
US 2023/0365183 A1   Nov. 16, 2023

(30) Foreign Application Priority Data
Oct. 2, 2020 (DE) ...................... 10 2020 212 481.7

(51) Int. Cl.
*B62D 1/19* (2006.01)
(52) U.S. Cl.
CPC .................................. *B62D 1/195* (2013.01)
(58) Field of Classification Search
CPC ........ B62D 1/181; B62D 1/184; B62D 1/192; B62D 1/185; B62D 1/19
See application file for complete search history.

(56) References Cited

U.S. PATENT DOCUMENTS

| 3,612,223 A | 10/1971 | Shiomi et al. |
| 5,547,221 A | 8/1996 | Tomaru et al. |

(Continued)

FOREIGN PATENT DOCUMENTS

| DE | 4138239 A1 | 5/1993 |
| DE | 102011015140 A1 | 9/2012 |

(Continued)

OTHER PUBLICATIONS

English Translation of International Search Report issued in PCT/EP2021/076770, dated Jan. 11, 2022.

*Primary Examiner* — Jason D Shanske
*Assistant Examiner* — Scott Lawrence Strickler
(74) *Attorney, Agent, or Firm* — thyssenkrupp North America, LLC

(57) ABSTRACT

A steering column for a motor vehicle comprises an actuating unit. A steering spindle is mounted rotatably about a longitudinal axis extending in the longitudinal direction. A supporting unit is connectable to a motor vehicle body and in which the actuating unit is held so as to be displaceable in the longitudinal direction. An energy absorption device, which is incorporated between the supporting unit and the actuating unit, has an elongate energy absorption element fastened to the actuating unit or to the supporting unit via a fastening. A deformation member, which interacts with the energy absorption element, is attached to the supporting unit or to the actuating unit. In the event of a crash with a relative displacement of actuating unit and supporting unit, the deformation member brings about an energy-absorbing plastic deformation of the energy absorption element.

14 Claims, 4 Drawing Sheets

(56) References Cited

U.S. PATENT DOCUMENTS

| | | | | |
|---|---|---|---|---|
| 6,439,357 | B1 * | 8/2002 | Castellon | B62D 1/195 |
| | | | | 188/374 |
| 10,829,144 | B2 * | 11/2020 | Domig | B62D 1/184 |
| 2013/0068062 | A1 * | 3/2013 | Kircher | F16F 7/125 |
| | | | | 74/492 |
| 2017/0120945 | A1 * | 5/2017 | Stinebring | B62D 1/181 |
| 2019/0232997 | A1 | 8/2019 | Domig | |
| 2020/0039570 | A1 | 2/2020 | Domig et al. | |
| 2020/0189648 | A1 * | 6/2020 | Domig | B62D 1/192 |
| 2020/0207402 | A1 | 7/2020 | Fricke | |
| 2022/0024512 | A1 * | 1/2022 | Boujenfa | B62D 1/192 |

FOREIGN PATENT DOCUMENTS

| | | |
|---|---|---|
| DE | 10 2016 220 531 A1 | 4/2018 |
| DE | 10 2016 220 532 A1 | 4/2018 |
| DE | 10 2016 220 533 A1 | 4/2018 |
| DE | 10 2017 213 912 A1 | 2/2019 |
| WO | WO-2018073306 A1 * 4/2018 | ............. B62D 1/192 |
| WO | WO-2020144172 A1 * 7/2020 | ............. B62D 1/184 |

\* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2021/076770, filed Sep. 29, 2021, which claims priority to German Patent Application No. DE 10 2020 212 481.7, filed Oct. 2, 2020, the entire contents of which are incorporated herein by reference.

FIELD

The present disclosure generally relates to a steering column for a motor vehicle, the steering column comprising an actuating unit.

BACKGROUND

In the case of a steering column of this type, the steering wheel is attached to the rear end of the steering spindle with respect to the direction of travel, the steering spindle being mounted rotatably in a casing tube, also called inner casing or inner casing tube, in the actuating unit. The actuating unit is held by a supporting unit which is mounted on the vehicle body.

In order to improve the occupant safety in the event of a vehicle collision, in the event of what is referred to as crash, in which a body impacts at high speed against the steering wheel, it is known to accommodate the actuating unit so as to be flexibly displaceable in the longitudinal direction relative to the supporting unit, for example in a telescopic arrangement in a casing unit, also called outer casing or outer casing tube, and to couple an energy absorption device, which is also called a crash system, between the actuating unit and the supporting unit. Safety steering columns of this type are known in the prior art, for example, from DE 10 2011 015 140 A1 or DE 10 2016 220 531 A1.

If, in the event of a crash, a high force peak exceeding a predefined limit value is exerted on the steering wheel by a body impacting against the steering wheel, the actuating unit and the supporting unit are pushed together in the longitudinal direction. In the process, an energy absorption element of the energy absorption device is plastically deformed and absorbs the kinetic energy, which is introduced in the longitudinal direction, by converting it into work of deformation, and therefore the body impacting against the steering wheel is decelerated in a controlled manner and the risk of injury is reduced.

In DE 10 2011 015 140 A1, it is proposed to attach an energy absorption strip which is elongate in the longitudinal direction, for example a strip-shaped metal sheet, to the actuating unit in the longitudinal direction as an energy absorption element, and, as deformation member, a deformation slide which is attached to an outer casing of the supporting unit and has a passage engaging around the longitudinal sides of the energy absorption strip. Said passage is smaller than the cross section of the energy absorption strip, i.e. the energy absorption strip is wider than the passage, as measured transversely with respect to the longitudinal direction. In the event of a crash, the deformation member is moved in the longitudinal direction along the energy absorption strip and pulled through the passage, with the energy absorption strip being plastically squeezed together continuously transversely over its length. This effectively absorbs energy.

In order to ensure reliable functioning, it is known from the prior art to fasten the energy absorption element to the actuating unit by means of a fastening in such a manner that the crash forces occurring in the longitudinal direction upon deformation in the event of a crash are reliably absorbed. For this purpose, it is proposed to fix both end regions of the energy absorption strip in a fixed position to the actuating unit by means of fastening devices which are designed as fixing connections. A secure support is thereby produced. However, during the plastic deformation in the event of a crash, not only is the cross section deformed, but the energy absorption strip is also extended or lengthened plastically in the longitudinal direction. This increase in length can lead to the energy absorption strip which is fixedly supported in the longitudinal direction between the fixing connections breaking free laterally and sagging transversely with respect to the longitudinal direction in a manner similar to a buckling rod. As a result, an undesirable impairment of the energy absorption characteristics can occur, which can lead to a nonuniform absorption of energy in the event of a crash.

Thus a need exists to provide an improved energy absorption device which permits a more uniform absorption of energy.

DETAILED DESCRIPTION

Figure 1:
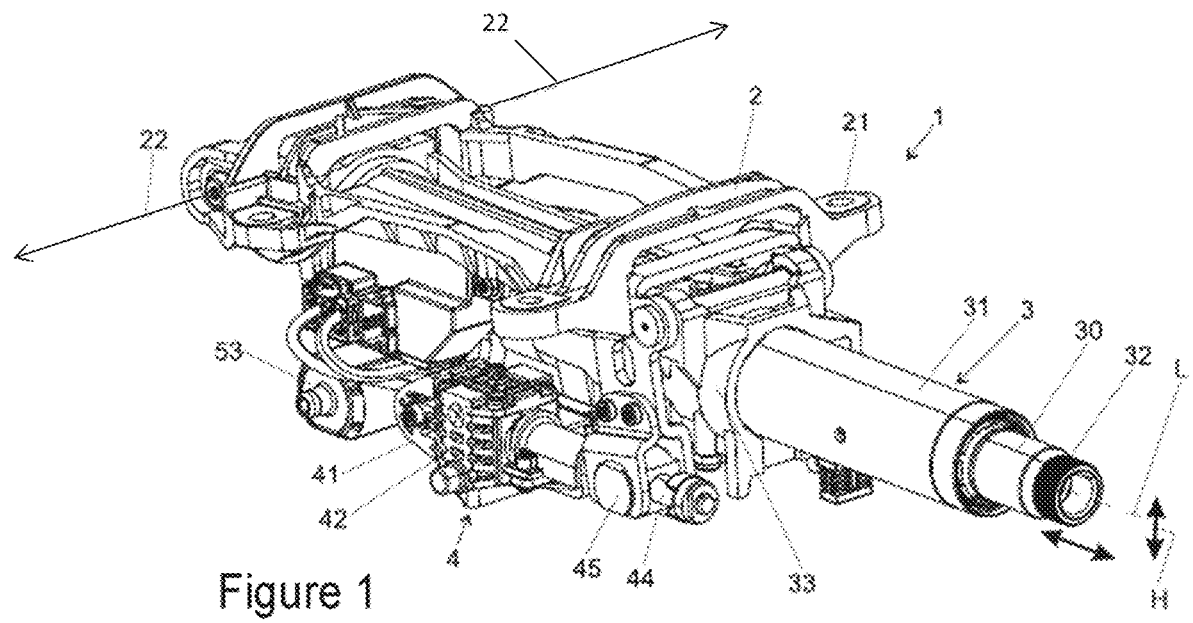
FIG. 1 is a schematic perspective view of a steering column according to an embodiment of the invention.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims.

In addition, all references to one skilled in the art shall be understood to refer to one having ordinary skill in the art.

The invention relates to a steering column for a motor vehicle, comprising an actuating unit. A steering spindle is mounted rotatably about a longitudinal axis extending in the longitudinal direction. A supporting unit is connectable to a motor vehicle body and in which the actuating unit is held so as to be displaceable in the longitudinal direction. An energy absorption device, which is incorporated between the supporting unit and the actuating unit, has an elongate energy absorption element fastened to the actuating unit or to the supporting unit via a fastening. A deformation member, which interacts with the energy absorption element, is attached to the supporting unit or to the actuating unit. In the event of a crash with a relative displacement of actuating unit and supporting unit, the deformation member brings about an energy-absorbing plastic deformation of the energy absorption element.

In the case of a steering column for a motor vehicle, comprising an actuating unit, in which a steering spindle is mounted rotatably about a longitudinal axis extending in the longitudinal direction, a supporting unit, which is connectable to a motor vehicle body and in which the actuating unit is held so as to be displaceable in the longitudinal direction, and an energy absorption device, which is incorporated between the supporting unit and the actuating unit and has an elongate energy absorption element, fastened to the actuating unit or to the supporting unit via a fastening, and has a deformation member, which interacts with said energy absorption element, is attached to the supporting unit or to the actuating unit and, in the event of a crash with a relative displacement of actuating unit and supporting unit, brings about an energy-absorbing plastic deformation of the energy absorption element, it is provided according to the invention that the fastening has at least one fastening device designed to be offset-compensating in the longitudinal direction.

The steering column according to the invention permits various embodiment variants in this respect: in a first embodiment, the energy absorption element is fastened to the actuating unit, and the deformation member interacting therewith is attached to the supporting unit. In a further embodiment variant, the energy absorption element is fastened to the supporting unit, and the deformation member interacting therewith is attached to the actuating unit.

In the invention, at least one fastening device, by means of which the energy absorption element is fastened to the actuating unit or to the supporting unit, is designed so as to be displaceable in the longitudinal direction in such a manner that it permits a movement in the longitudinal direction of the energy absorption element relative to the actuating unit or supporting unit. In other words, by means of the possible relative displacement within the fastening device according to the invention, a local offset in the longitudinal direction, which arises due to a lengthening of the energy absorption element during the plastic deformation in the event of a crash, can be compensated for. By means of the offset-compensating fastening device according to the invention, the energy absorption element, preferably an elongate strip-shaped energy absorption strip, is fixed and held transversely with respect to the longitudinal direction, i.e. radially and in the circumferential direction with respect to the longitudinal axis, as is also the case with the rigid fixing connections in the prior art. In contrast thereto, according to the invention, the fastening point can also move in the longitudinal direction during an increase in length, and therefore, during the deformation in the event of a crash, a compressive stress is not built up in the longitudinal direction in the energy absorption element, and the loading similar to a buckling rod no longer exists. The advantage achieved by this is that breaking free or lateral sagging is avoided, even if the energy absorption element is designed as an energy absorption strip in the form of a relatively narrow sheet metal strip or the like.

The relative displacement within the fastening device according to the invention preferably takes place without plastic deformation and without energy absorption, and at least such as is undesirable. In a theoretically ideal fastening device according to the invention, the relative displacement, i.e. the offset compensation, would take place without a resistance force opposing said displacement, since the higher the force for the relative displacement to realize the offset compensation, the greater the extent to which the disadvantages of the disadvantageous rigid connection known from the prior art would occur. The resistance force is therefore preferably configured to be of such a small size that it is insignificant for the relative displacement for the offset compensation, for example in the elongated hole, and technically.

The offset-compensating fastening device is preferably formed spatially and functionally separately from an energy absorption portion of the energy absorption element. The energy absorption portion is plastically deformed by means of the deformation member, and the fastening device is arranged outside the deformable region and is not deformed during the absorption of energy in the event of a crash. Owing to this separate design, the individual portions can be precisely configured and optimized for the function conceived for them without them having a disadvantageous effect on one another.

One advantage is therefore the increased functional reliability during the absorption of energy in the event of a crash. This leads to an increase in occupant safety. A further advantage is that the design freedom for the energy absorption element is increased since the latter is not, or is at least less, subjected to a compressive stress in the longitudinal direction, and therefore, for example, a higher degree of deformation can be permitted. Owing to the invention, the associated greater lengthening in the event of a crash can namely be reliably compensated for and does not affect the absorption of energy. A relatively narrower energy absorption strip than in the prior art can also be used, as a result of which construction space can be optimized.

It can preferably be provided that a fastening device is arranged in each end region of the energy absorption element. The energy absorption element can be, for example, of strip-shaped design in the form of a narrow energy absorption strip or deformation strip which is elongate in the longitudinal direction, for example in the form of a sheet metal strip or sheet metal web. The fastening has at least two fastening devices which are arranged in the end regions of the energy absorption strip. Accordingly, a fastening device is arranged in each case at the front and rear in the direction of travel. According to the invention, at least one of the two fastening devices is configured to be offset-compensating, i.e. displaceable in the longitudinal direction.

It is advantageous that the fastening has a fixing connection which is secured in the longitudinal direction, i.e. is fixed. Said fixing connection forms a rigid connection, which is nondisplaceable in the longitudinal direction, between the energy absorption element and actuating unit. An energy absorption device configured according to the invention therefore has at least one fixing connection which is fixed in the longitudinal direction and an offset-compensating fastening device which is variable in the longitudinal direction. One advantage here is that the fixing connection can be configured, independently of the compensating function according to the invention, so as to be loadable such that a secure support in the longitudinal direction is ensured in the event of a crash. In the event of a crash, the energy absorption element is held in a fixed position in the fixing connection, and, according to the invention, is displaceable in the longitudinal direction in a portion moving in the longitudinal direction because of the lengthening.

In the previously described embodiment with the fastening devices arranged at the front and rear, it is advantageous that the fastening device at the front in the driving direction is designed as a fixing connection, and, correspondingly at the rear, there is an offset-compensating fastening device. In a normal operating state before a crash, the deformation member in the front end region of the energy absorption strip is located in the region of the fixed connection, and, in the event of a crash, is moved over the length of the energy absorption element in the direction of the rear, offset-compensating fastening element. The energy absorption element is subjected here to a tensile load in the longitudinal direction between the fixing connection and the deformation member and is thereby lengthened or elongated. The longitudinal offset between the energy absorption strip and the actuating unit that occurs at the other fastening device at the rear end is compensated for by the offset-compensating fastening device according to the invention.

In an advantageous embodiment of the invention, the offset-compensating fastening device has an elongated hole which extends in the longitudinal direction and through which a connecting element extends. An elongated hole can be formed with little outlay in the energy absorption element, and the connecting element can be fixed to the actuating unit. For example, the elongated hole can be formed in an end portion of a deformation strip made of sheet metal, for example by means of punching. The connecting element can be in the form of a pin or bolt and can have a transverse dimension corresponding to the elongated hole such that it is displaceable in the longitudinal direction in the elongated hole. The connecting element is preferably held in a manner free from play or low in play in the transverse direction, and therefore the fastening in the circumferential direction transversely with respect to the longitudinal direction is fixed and immovable. In this way, the fastening device according to the invention has a sliding guide in the longitudinal direction. The connecting element is inserted from the outside through the elongated hole and is connected nondisplacably in the longitudinal direction to the actuating unit. As a result, a displaceable connection which is variable in the longitudinal direction is simply and effectively provided, and the energy absorption element can be displaced in the longitudinal direction relative to the actuating unit by the length of the elongated hole, and an offset occurring due to lengthening in the event of a crash can be compensated for.

In an advantageous development, the elongated hole has, at least in one portion, a clearance fit with respect to the connecting element. Tests have shown that clearance fits with a play of more than 10 μm have virtually no interfering resistance forces during the offset compensation, and in particular stick-slip effects can thus be very substantially avoided. Clearance fits with a play greater than 10 μm are therefore particularly preferred. The clearance fit is determined here in a movement transversely with respect to the direction of movement of the offset-compensating movement.

In an advantageous development, it can be provided that the elongated hole, in a further portion, has an interference fit with respect to the connecting element. The connecting element is arranged in said portion before the offset-compensating movement occurs and is moved out of said portion by the offset-compensating movement, into the portion with the clearance fit. Owing to the interference fit portion, the energy absorption element can be reliably secured to the actuating unit or the supporting unit without an interfering play.

The connecting element can be in the form of a rivet, hollow rivet, journal, bolt or screws or the like, is fixed to the actuating unit, and is preferably connected nonreleasably to the actuating unit, for example by attaching to the outside of the casing tube.

The outside of the connecting element can preferably have a head which protrudes over the transverse dimension of the elongated hole and with which the energy absorption element is held from the outside against the actuating unit. The energy absorption element is thereby held in a form-fitting and secure manner on the actuating unit.

It can be provided that the elongated hole is closed in the longitudinal direction, preferably on both sides. The resultantly predefined length of the elongated hole minus the cross section of the connecting element limits the displacement in the longitudinal direction and therefore the possible offset compensation in the event of a crash. One advantage here is that the energy absorption element, for example an energy absorption strip, is held on the actuating unit in every direction even during and after a lengthening in the event of a crash.

It can alternatively be provided that the elongated hole is open at one end. Owing to the elongated hole being open toward one end of the energy absorption element in the longitudinal direction, a fork-shaped arrangement is formed. One advantage is that, for the installation, a connecting element can be already arranged or formed on the actuating unit, and the fork-shaped opening can simply be inserted in the longitudinal direction such that the connecting element is pushed into the elongated hole.

A fixing connection which is fixed in the longitudinal direction can be produced with little outlay and reliably by virtue of the energy absorption element having a fastening opening in which an abovementioned connecting element is also accommodated in a form-fitting manner without play in the longitudinal direction.

It can be provided that the energy absorption element has a deformation strip around which the deformation member engages. A deformation strip, also called energy absorption strip, can have a strip-shaped web or strip, for example a narrow sheet metal strip made from steel or another metallic material, or else from a plastic. The deformation strip is guided through a passage, which is continuous in the longitudinal direction, in the deformation member, which can be designed as a slide supported on the supporting unit in the longitudinal direction, the passage engaging around the longitudinal sides of the deformation strip and preferably being smaller than the latter in the transverse direction. By means of the relative movement, the deformation strip is pulled in the event of a crash through the passage and continuously plastically squeezed in the longitudinal direction, i.e. deformed with energy being absorbed. The passage can be U-shaped, and therefore the slide can be placed from the outside onto the deformation strip. Such an arrangement which is basically described in DE 10 2011 015 140 A1 or DE 10 2016 220 531 A1 which have been mentioned, can be advantageously configured to be more flexible and to have increased functional reliability by the invention without an additional manufacturing outlay.

It can be provided that the supporting unit has a casing unit which is adjustable in the vertical direction and in which the actuating unit is accommodated. Such a vertical adjustment can be realized, for example, in a manner which is known per se by a casing tube of the actuating unit being mounted in a front region in the direction of travel and remote from the steering wheel so as to be pivotable upward and downward about a horizontal pivot axis, which is arranged transversely with respect to the longitudinal direction, on the supporting unit. As a result, the steering wheel which is attached to the rear of the steering spindle can be adjusted in height.

It is possible that the actuating unit has a casing tube or inner casing which is arranged telescopically in a casing unit consisting of an outer casing. A steering column with a length-adjustable casing arrangement consisting of casing tubes arranged in a casing unit so as to be singly or multiply telescopically adjustable is known per se, for example from DE 10 2016 220 531 A1 which has been mentioned. The energy absorption device is coupled between two casings, wherein, owing to the invention, greater safety in the event of a crash can be achieved, and improved energy absorption and a more compact design can be realized by a greater possible degree of deformation of the energy absorption element.

A length adjustment and vertical adjustment can preferably be combined with each other.

It can be provided that the supporting unit has a clamping device which can be brought into a fixing position or a release position, wherein the actuating unit is secured relative to the supporting unit in the fixing position, and is adjustable relative to the supporting unit in the release position. Telescopic casing tubes can be releasably braced by the clamping device in order to permit a longitudinal adjustment in the release position. If a vertical adjustment is provided, the actuating unit can additionally be braced releasably against the supporting unit in order to permit a vertical adjustment in the release position. The actuation can be undertaken manually, for example via a manually operable clamping lever which interacts with a clamping device which is known per se, such as a V-pulley device, cam device or tilting pin device, in order either to fix the steering wheel adjustment in the driving mode or to permit an adjustment for adaption to the driver's position in the release position.

It can likewise be provided that a motorized adjusting drive is arranged between the supporting unit and the actuating unit. An adjusting drive can be coupled between casings for the longitudinal adjustment. The adjusting drive can comprise, for example, a spindle drive, with a spindle nut arranged on a threaded spindle, and with an electric drive motor, by which the threaded spindle and the spindle nut are drivable rotationally relative to each other. Adjusting drives of this type are basically known from the prior art and are considered to be reliable and robust. The spindle nut is attached nondisplacably in the longitudinal direction to one casing, and the threaded spindle to the other casing which is telescopic with respect thereto. A drive motor is used to rotationally drive the spindle nut or the threaded spindle via a suitable transmission, for example a worm or belt transmission, as a result of which the threaded spindle or spindle nut which is fixed with regard to rotation relative thereto is moved translationally in the direction of the spindle axis, and, depending on the relative direction of rotation, the casings are brought together or moved apart in the longitudinal direction. For vertical adjustment, a similarly configured motorized adjusting drive can be incorporated in the vertical direction between the actuating unit or casing unit and the supporting unit. The longitudinal and vertical adjusting drives may be combined if required.

In the various figures, identical parts are always provided with the same reference signs and are therefore usually each only named or mentioned once in each case.

Figure 2:
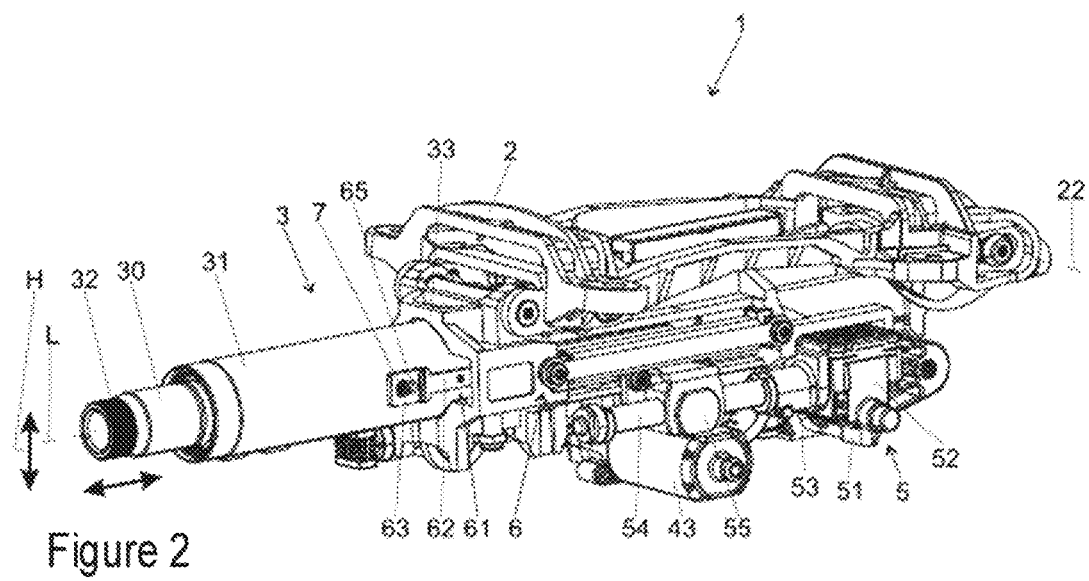
FIG. 2 is a further perspective view of the steering column according to FIG. 1.

FIGS. 1 and 2 illustrate a steering column 1 according to the invention schematically in a perspective view obliquely from the rear (based on the direction of travel of a motor vehicle which is not shown).

The steering column 1 can be fastened to the body of a motor vehicle, not illustrated, by means of a supporting unit 2, also called a bracket. For the connection to the vehicle body, the supporting unit 2 comprises fastening means 21 which are designed here as fastening openings. In the embodiment variant illustrated here, the supporting unit 2 is produced as a cast part from a light metal alloy. Alternatively, a supporting unit 2 which is in the form of a sheet metal bent component is also conceivable and possible.

An actuating unit 3 comprises a steering spindle 30 which is mounted in an inner casing tube 31, also called inner casing 31, so as to be rotatable about its longitudinal axis L extending in the longitudinal direction. A fastening portion 32 for fastening a steering wheel, not illustrated, for the manual input of steering commands is formed at the rear of the steering spindle 30. The inner casing tube 31 is accommodated and held in an outer casing tube 33, also called for short outer casing, outer casing unit or casing unit, so as to be displaceable telescopically in the longitudinal direction.

To realize a vertical adjustment, the casing unit 33 is mounted on the supporting unit 2 so as to be pivotable about a horizontal pivot axis 22 such that the steering spindle 30 can be moved up and down in a vertical direction H, as is indicated by the double arrow.

An adjusting drive 4 designed as a rotational spindle drive serves for the vertical adjustment and has a drive unit 41 with a drive housing 42 on which an electric motor 43 is flange-mounted as the drive motor. A transmission, which is not illustrated specifically here, coupled to the motor 43 is accommodated in the drive housing 42 and can be designed, for example, as a worm transmission. At the output of the transmission, a threaded spindle 44 can be driven so as to rotate about its spindle axis. Said threaded spindle 44 extends axially, i.e. in the direction of the spindle axis from the drive housing 42 which, for its part, is supported axially on the casing unit 33.

The threaded spindle 44 engages by means of its outer thread in a spindle nut 45 which is fixed with respect to rotation about the spindle axis G. The spindle nut 45 acts on an actuating lever 23 which is mounted between the casing unit 33 and the supporting unit 2 in horizontal pivot bearings spaced apart from one another. As a result, a rotating drive of the threaded spindle 44 leads to an axial linear displacement of the spindle nut 45 and thereby to an adjustment of the actuating lever 23, as a result of which the outer casing tube 33 together with the actuating unit 3 can be adjusted in the vertical direction H relative to the supporting unit 2.

A second adjusting drive 5, likewise constructed similarly in principle as a spindle drive, is provided for the longitudinal adjustment. Said adjusting drive comprises a drive unit 51, a drive housing 52, a motor 53, a threaded spindle 54 and a spindle nut 55. The drive housing 52 is supported axially on the outer casing 33, the threaded spindle 54 lies substantially parallel to the longitudinal axis L, and the spindle nut 55 acts on the casing tube 31 in the direction of the longitudinal axis L. By activation of the drive unit 51, the inner casing tube 31 can thereby be telescopically retracted or extended in the longitudinal direction relative to the outer casing 33, as indicated by a double arrow.

Figure 3:
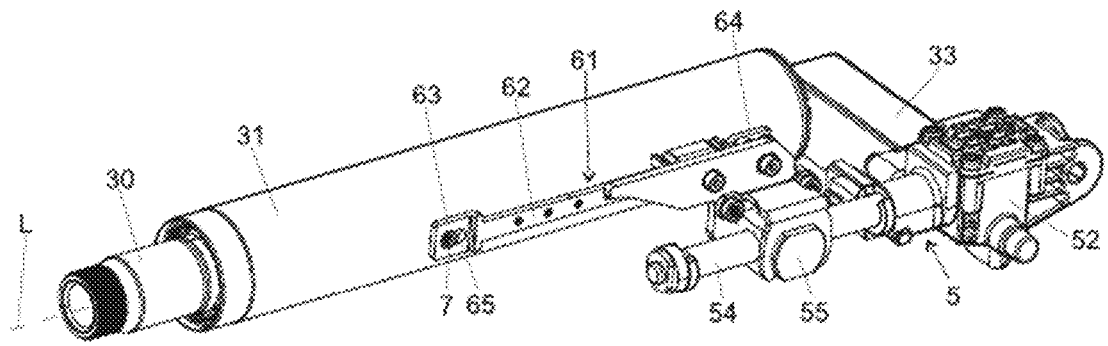
FIG. 3 is a cropped view of an energy absorption device of a steering column according to FIG. 1.
Figure 5:
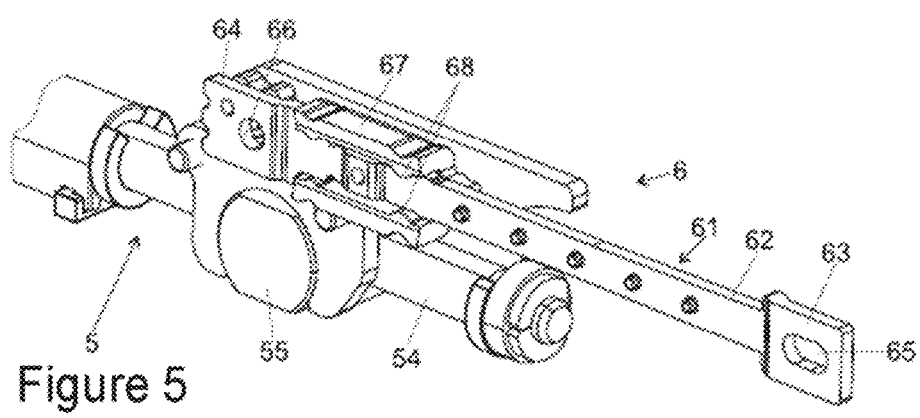
FIG. 5 is a further perspective view of the energy absorption device according to FIG. 3.
Figure 6:
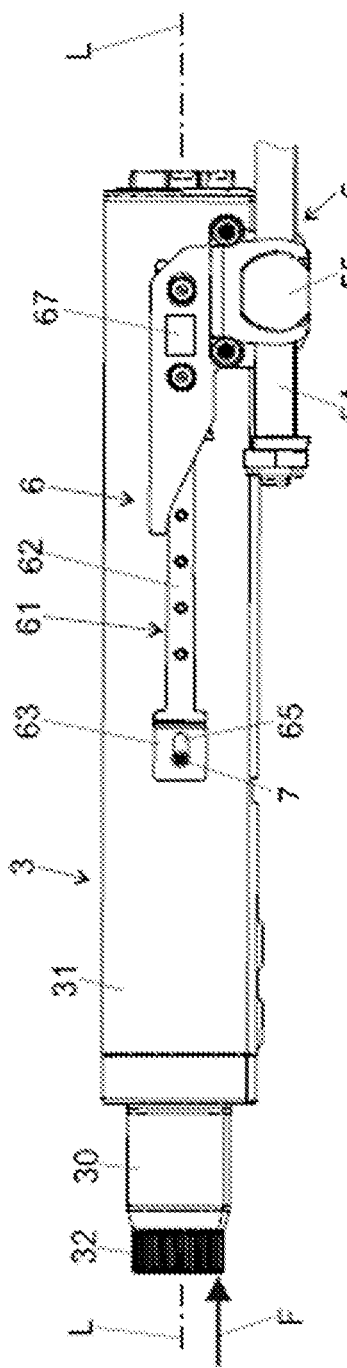
FIG. 6 is a partially schematic side view of a steering column according to FIG. 1 in a normal operating state before a crash.
Figure 7:
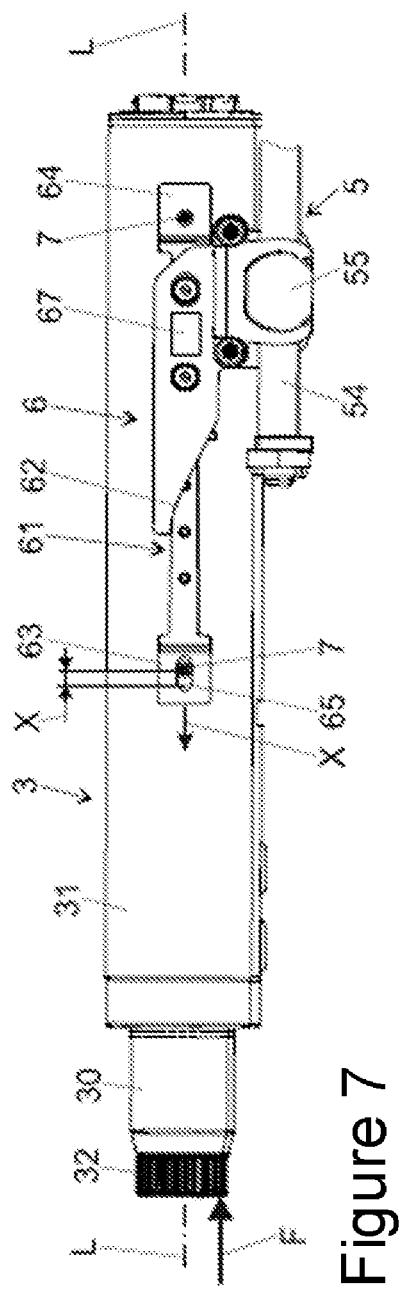
FIG. 7 is a partially schematic side view of a steering column analogously to FIG. 6 after a crash.

An energy absorption device 6 is shown in schematically cropped form in FIG. 3 in the perspective of FIG. 2, with the outer casing 33 being omitted for better clarity. FIG. 5 shows a view from the opposite side, with the inner casing tube 31 also being omitted. FIGS. 6 and 7 show side views of the arrangement of FIG. 3 before a crash (FIG. 6) and after a crash (FIG. 7).

The energy absorption device 6 comprises an energy absorption element which is in the form of a deformation strip 61. The latter has a strip-shaped deformation portion 62 which is elongated in the longitudinal direction, and has, in its rear end region, a fastening portion 63 configured according to the invention, and, in its other, front end region, a conventional fastening portion 64. Between the fastening portions 63, 64, the deformation portion 62 has the energy absorption portion.

The fastening portion 63, 64 are bent such that they lie against the outside of the inner casing tube 31, while the deformation portion 62 is at a distance from the outer surface of the inner casing tube 31.

Figure 4:
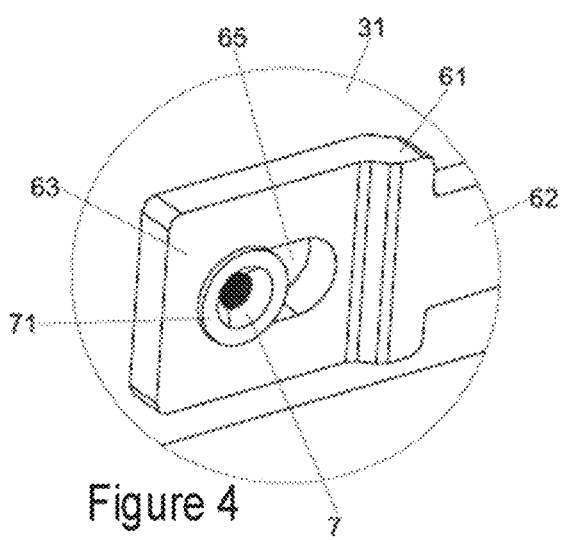
FIG. 4 is a detailed view of the energy absorption element from FIG. 3.

The fastening portion 63 illustrated in detail in enlarged form in FIG. 4 has, according to the invention, an elongated hole 65 which is elongate in the longitudinal direction. A connecting element 7 which can be in the form of a rivet or bolt and which is movable in the longitudinal direction in the elongated hole 65 extends through the elongated hole 65. The connecting element 7 preferably has a head 71 which protrudes transversely over the elongated hole 65 and therefore holds the fastening portion 63 in a form-fitting manner from the outside of the inner casing tube 31.

The connecting element 7 which is displaceable longitudinally in the elongated hole 65 forms an offset-compensating fastening within the meaning of the invention, which makes it possible for the fastening portion 63 to be movable relative to the inner casing tube 31 in a manner guided in the longitudinal direction.

The elongated hole 65 and the connecting element 7 are preferably designed in such a manner that they are movable relative to each other with as little force as possible in the event of a crash in order thus to permit the offset-compensating displacement according to the invention.

The elongated hole 65 preferably has, at least in one portion, a clearance fit with respect to the connecting element 7. Tests have shown that clearance fits with a play of more than 10 μm have virtually no interfering resistance forces during the offset compensation, and in particular stick-slip effects can thus be very substantially avoided.

A fastening opening 66 is formed in the other fastening portion 64 and the passage cross section of said fastening opening corresponds substantially without play to the connecting element 7 inserted through it, for example is circular like the connecting element, and therefore a fixing connection which is also secured in a form-fitting manner in the longitudinal direction is produced between the deformation strip 61 and the inner casing tube 31 of the actuating unit 3.

A deformation member in the form of a deformation slide 67 is attached to the spindle nut 55 and is fastened via the threaded spindle 54 and the drive housing 52 to the outer casing 33 and is supported in the longitudinal direction.

The deformation slide 67 has a U-shaped basic shape with two deformation limbs 68 which mutually delimit a passage which is longitudinally continuous. The deformation slide 67 engages around the deformation strip 61 from the outside in such a manner that the deformation portion 62 is guided through the passage. The distance between the deformation limbs 68, which indicates the width of the passage, is smaller than the width of the deformation portion 62 as measured transversely with respect to the longitudinal direction.

In the event of a crash, a body impacting against the steering wheel causes a large force F to act forward in the longitudinal direction against the actuating unit 3, as is indicated schematically in FIG. 6 in the side view of the actuating unit 3 before the crash. This crash force F causes the inner casing tube 31 together with the deformation strip 61 to be displaced forward relative to the outer casing 33 and the adjusting drive 5 attached thereto. The deformation portion 62 is pushed forward in the longitudinal direction through the passage of the deformation slide 67 which, in FIGS. 6 and 7, is concealed by the spindle nut 55 supported on the adjusting drive 5 and is shown by dashed lines. By means of the deformation limbs 68, the deformation portion 62 is plastically squeezed together continuously transversely over its length in the crash, as a result of which kinetic energy is converted into work of deformation and is thereby absorbed.

By means of the continuous squeezing together in the transverse direction, the deformation portion 62 is not only plastically deformed in the transverse direction, but also lengthened in the longitudinal direction by an amount X, i.e. extended or lengthened plastically in the longitudinal direction, as shown in the state after the crash in FIG. 7. The fixing connection of the front fastening portion 64 is fixed in the longitudinal direction. The lengthening causes the rear fastening portion 63 to move rearward by an offset with the amount X. The connecting element 7 can slide along in the elongated hole 65 in an offset-compensating manner such that the fastening portion 63 can move to the rear in the longitudinal direction relative to the actuating unit 3. As a result, the offset produced by the lengthening of the deformation strip 61 is compensated for, and bending stresses which could lead to a damaging sagging of the deformation portion 62 in the event of a crash do not occur.

Figure 9:
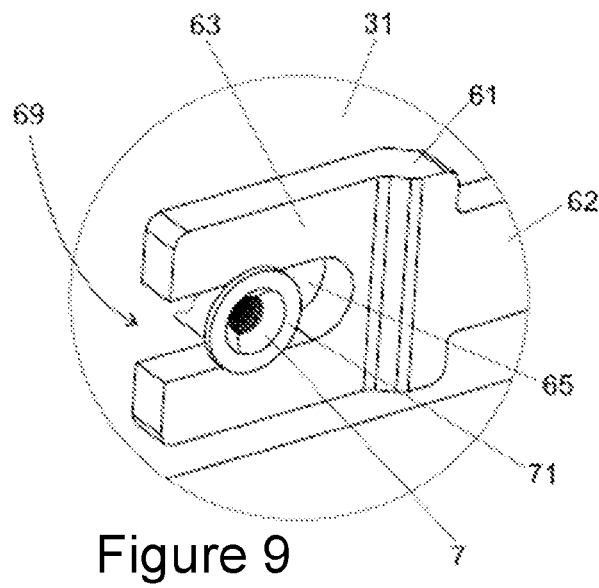
FIG. 9 is a detailed view as in FIG. 3 of an energy absorption element in a second embodiment.

FIG. 9 shows, in the same view as FIG. 4, a modification of the invention, with the elongated hole 65 being open toward the end of the fastening portion 63, i.e. having an opening 69. As a result, an easily mountable, fork-shaped arrangement is formed.

Figure 8:
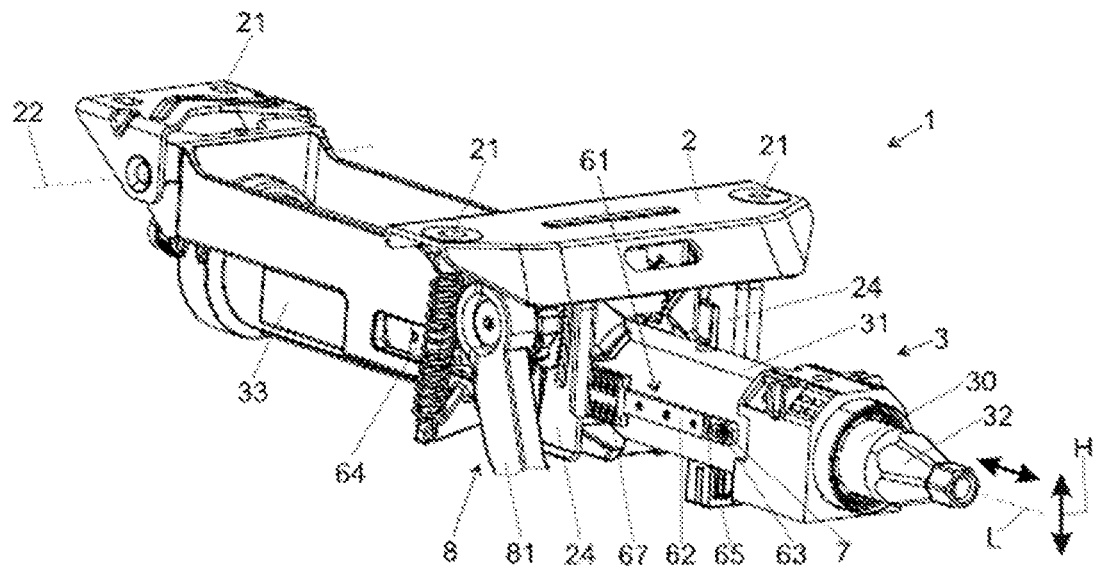
FIG. 8 is a schematic perspective illustration of a second embodiment of a steering column according to the invention.

FIG. 8 shows, in a view similar to FIG. 1, a manually adjustable steering column 1 which does not have adjusting drives 5, 6, but otherwise the same reference signs are used.

The outer casing 33 is arranged in a vertically adjustable manner between two side cheeks 24 protruding downward in a fork-shaped manner. By means of a clamping device 8, which can be brought either into a fixing position or release position by manual actuation of a clamping lever 81, said side cheeks 24 can be braced in the fixing position with a force fit against the outer casing 33 such that the latter is fixed in the vertical direction between the side cheeks 24 and at the same time the inner casing 31 is clamped in the outer casing 33 and fixed in the longitudinal direction relative thereto. The bracing is released in the release position, and therefore manual adjustment in the longitudinal and vertical directions can take place.

As in the first embodiment adjustable by motor, the energy absorption device 6 is incorporated in terms of effect in the longitudinal direction between inner casing 31 and outer casing 33. The lengthening X occurring in the event of a crash can be compensated for, as described, by the offset-compensating configuration of the fastening of the rear fastening portion 63 of the deformation strip 61 such that the advantages according to the invention are realized.

LIST OF REFERENCE SIGNS

- 1 steering column
- 2 supporting unit
- 21 fastening means
- 22 pivot axis
- 23 actuating lever
- 24 side cheek
- 3 actuating unit
- 31 inner casing tube
- 32 fastening portion
- 33 outer casing tube (outer casing)
- 4, 5 adjusting drive
- 41, 51 drive unit
- 42, 52 drive housing
- 43, 53 motor
- 44, 54 threaded spindle
- 45, 55 spindle nut
- 6 energy absorption device
- 61 deformation strip
- 62 deformation portion
- 63, 64 fastening portion
- 65 elongated hole
- 66 fastening opening
- 67 deformation slide
- 68 deformation limb
- 69 opening
- 7 connecting element
- 71 head
- 8 clamping device
- 81 clamping lever
- L longitudinal axis
- H vertical direction
- F crash force
- X amount of the lengthening (offset)

What is claimed is:

1. An electric-adjustable steering column for a motor vehicle, the electric-adjustable steering column comprising:
    an actuating unit, in which a steering spindle is mounted rotatably about a longitudinal axis (L) extending in the longitudinal direction;
    a supporting unit, which is connectable to a motor vehicle body and in which the actuating unit is held so as to be displaceable in the longitudinal direction;
    a motorized adjusting drive arranged between the supporting unit and the actuating unit; and
    an energy absorption device, which is incorporated between the supporting unit and the actuating unit and has an elongate energy absorption element, fastened to the actuating unit or to the supporting unit via a fastening, and has a deformation member, which interacts with said energy absorption element, is attached to the supporting unit or to the actuating unit and, in the event of a crash with a relative displacement of actuating unit and supporting unit, brings about an energy-absorbing plastic deformation of the energy absorption element;
    wherein the fastening has at least one fastening device that is offset-compensating in the longitudinal direction, wherein the offset-compensating fastening device has an elongated hole which extends in the longitudinal direction and through which a connecting element extends, and wherein the elongated hole and the connecting element are movable relative to each other and are configured to minimize resistance to their relative movement.

2. The steering column as claimed in claim 1 wherein the fastening is arranged in each end region of the energy absorption element.

3. The steering column as claimed in claim 2 wherein the fastening has a fixing connection secured in the longitudinal direction.

4. The steering column as claimed in claim 1 wherein the elongated hole is formed in the energy absorption element, and the connecting element is fixed to the actuating unit.

5. The steering column as claimed in claim 4 wherein the elongated hole is closed in the longitudinal direction.

6. The steering column as claimed in claim 5 wherein the elongated hole is open at one end.

7. The steering column as claimed in claim 6 wherein the energy absorption element has a deformation strip around which the deformation member engages.

8. The steering column as claimed in claim 7 wherein the supporting unit has a casing unit which is adjustable in the vertical direction (H) and in which the actuating unit is accommodated.

9. The steering column as claimed in claim 8 wherein the actuating unit has a casing tube which is arranged telescopically in the casing unit.

10. The steering column as claimed in claim 9 wherein the supporting unit has a clamping device which can be brought into a fixing position or a release position, wherein the actuating unit is secured relative to the supporting unit in the fixing position, and is adjustable relative to the supporting unit in the release position.

11. The steering column as claimed in claim 1 wherein the elongated hole and the connecting element are movable relative to each other with minimal resistance to permit the offset-compensating displacement.

12. The steering column as claimed in claim 1 wherein the elongated hole and the connecting element have a clearance fit.

13. The steering column as claimed in claim 1 wherein the elongated hole and the connecting element have a clearance fit with a play of more than ten μm.

14. The steering column as claimed in claim 1 wherein the elongated hole and the connecting element are configured such that resistance to their relative movement is not significant to the offset-compensating displacement.

* * * * *